James R. Cox INVENTOR.

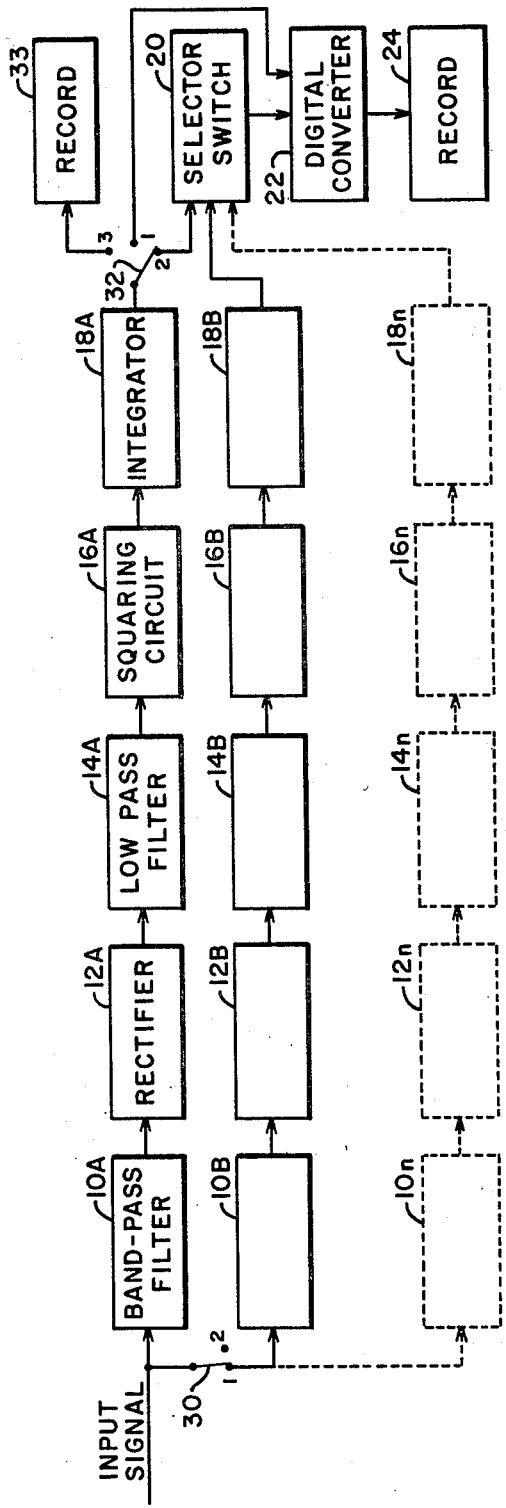
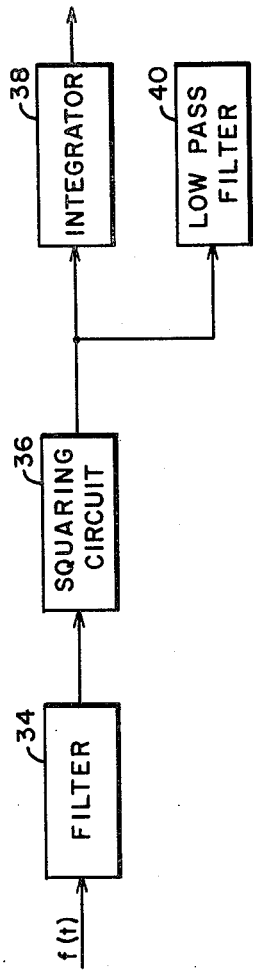

BY John D. Gassett
ATTORNEY

3,167,710
SYSTEM FOR ANALYSIS OF ELECTRICAL SIGNALS INCLUDING PARALLEL FILTER CHANNELS
James R. Cox, Tulsa, Okla., assignor to Jersey Production Research Company, a corporation of Delaware
Filed Feb. 1, 1961, Ser. No. 86,342
9 Claims. (Cl. 324—77)

This invention relates broadly to the analysis of electrical transients. It relates more particularly to a system for determining the frequency power spectrum of an electrical transient.

In the study and analysis of electrical transients it is desired and frequently necessary to known the frequency power spectra thereof. In the conventional system most commonly used, it becomes increasingly difficult to obtain such frequency power spectrum as the frequencies of the signal to be analyzed increases. In the conventional system a narrow band pass filter passes a small band of the frequencies present in the electrical transient. The output of this narrow band pass filter is squared and integrated over the portion of the transient being analyzed. The integrated product gives one point on the power spectrum of the transient being analyzed. This process is repeated, adjusting the filter to the next band of frequencies, until enough points are determined to indicate the envelope of the power spectrum. As the frequencies of the transient being analyzed increases, it becomes increasingly difficult to find devices that will square the output of the band pass filter. In other words, it becomes increasingly difficult to find accurate squaring devices as the frequency of the signal to be squared increases. The new method described and disclosed herein reduces the frequency of the signal that the multiplying circuit must square, thus greatly increases the range of frequencies which can be analyzed accurately.

Briefly, the invention includes a band pass filter through which the transient being analyzed is fed. The output of this band pass filter is rectified. The output of the rectifier is then fed to a low pass filter which passes only those frequencies which are approximately equivalent to or less than the width of the band pass of the first filter. The low pass filter rejects frequencies equal to and higher than the lowest frequency of the first band pass filter. The output of the second or low pass filter is then squared and integrated to determine one point on the power spectrum. This process is repeated until the frequency range of interest has been covered.

Various objects and a complete understanding of this invention may be had from the following description taken in conjunction with the drawing in which:

FIG. 1 is a block diagram illustrating the preferred embodiment of this invention;

FIG. 2 illustrates in block diagram form a conventional circuit for frequency spectrum analyses;

Figure 5:
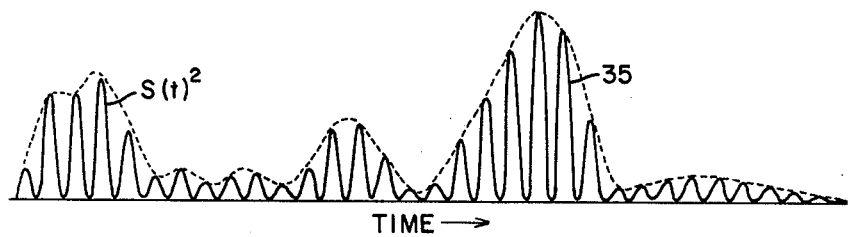
FIG. 5 represents a curve which is the square of the wave form shown in FIG. 4.
Figure 6:
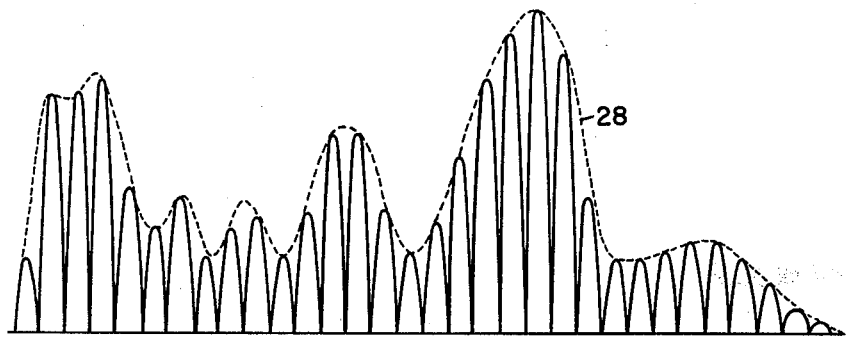
FIG. 6 illustrates the curve illustrated in FIG. 4 after rectification.
Figure 7:
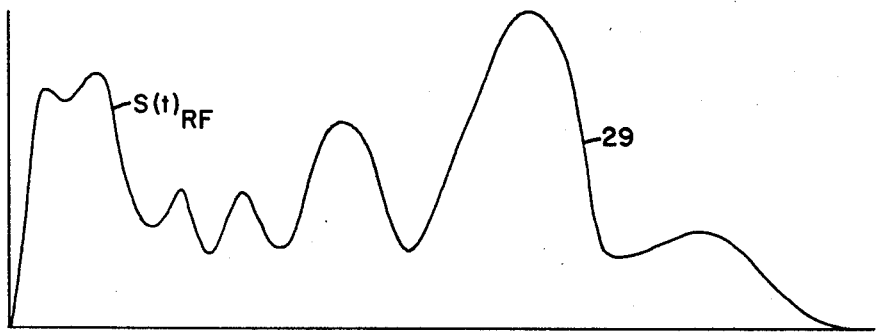
Figure 8:
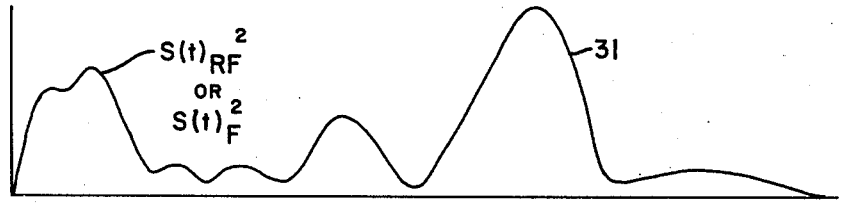
Figure 9:
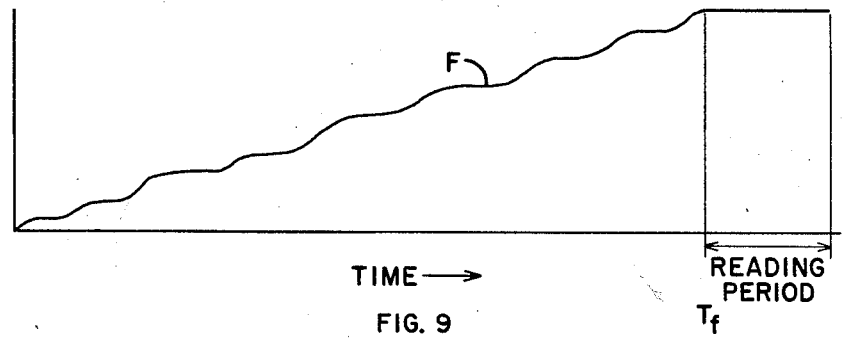

FIG. 7 approximates the envelope of the curve in FIG. 6 which is obtained by filtering;

FIG. 8 is another wave form representing the result of squaring the wave illustrated in FIG. 7 and also illustrative of the result of low pass filtering of the wave form shown in FIG. 5;

FIG. 9 represents the integral of a wave form such as that shown in FIG. 8 or FIG. 5.

Figure 3:
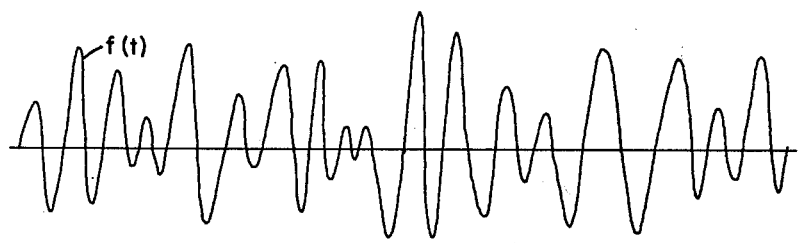
FIG. 3 represents a portion of a typical electrical transient.
Figure 4:
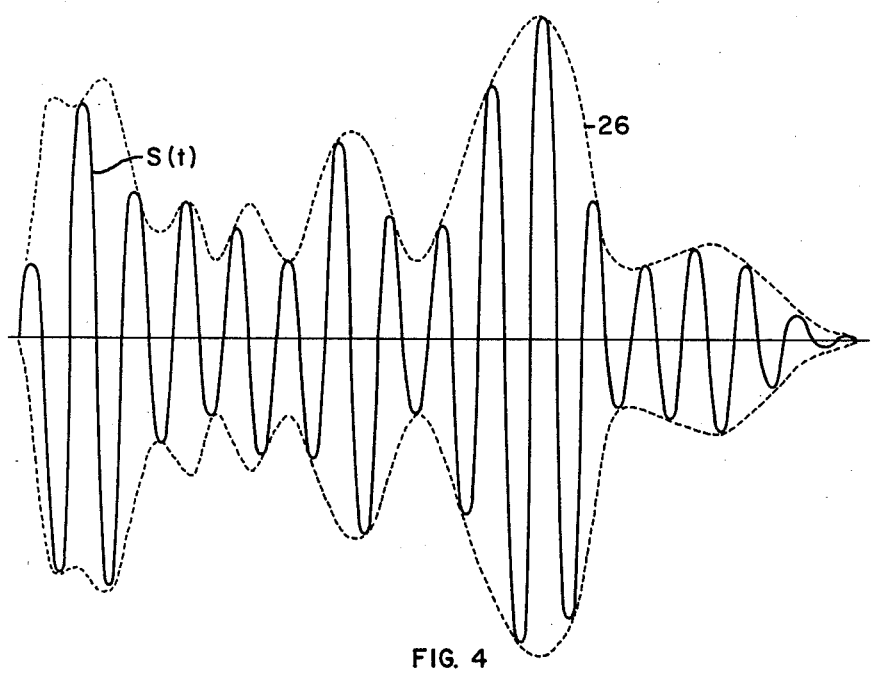
FIG. 4 represents the output of a narrow band pass filter to which the transient shown in FIG. 3 is applied.

The wave forms of FIGS. 3 through 6 are normally of higher frequency than that shown. The number of up and down excursions of the signal were reduced to simplify the drawing. However, the envelopes of signals shown in FIGS. 4 through 6 are similar to the envelopes of observed wave forms.

The portion of the wave form which illustrated in FIG. 3 is described as $f(t)$. In the analysis of this transient under consideration here, it is desired to obtain an essentially continuous power spectra.

The mean square value of a transient $g(t)$ is given in Equation 1

(1) $$\frac{1}{T}\int_0^T g(t)^2 dt = \overline{g(t)^2}$$

where T is the duration of the transient.

As the instantaneous power in a resister is the instantaneous voltage $v(t)$ times the instantaneous current $i(t)$, the average power $\overline{P}$ is (2) $$\overline{P} = \frac{1}{T}\int_0^T v(t)i(t)\,dt$$

but $$i(t) = \frac{v(t)}{R}$$

where R is a resistance to which the signal is applied, then substitution Equation 3 is obtained.

(3) $$\overline{P} = \frac{1}{T}\int_0^T \frac{v(t)^2 dt}{R} = \frac{\overline{v(t)^2}}{R}$$

The average power then is portional to the means square voltage, thus if the mean square voltage is obtained, then the average power is also readily obtained. The electrical transient to be analyzed is divided into a group of narrow bands of frequencies over the desired frequency range. The average power is then determined for each narrow band of frequencies. The various average powers thus determined define the power spectrum of the transient signal. It is thus clear that by measuring the means square voltage from filters that pass narrow bands of frequencies throughout the required frequency range that a measure is obtained which approximates the power spectrum of the transient being analyzed.

In the conventional methods of finding power spectra, means square voltage of the outputs of narrow band pass filters is found by first squaring the signal and then integrating. For analysis, the output $S(t)$ of one of these band pass filters will be assumed to be a large number of finite frequencies rather than a continuous range of frequencies. The error caused by this assumption can be made as small as desired by increasing the number of frequencies. The output can be represented by Equation 4, (4) $S(t) = A_1 \sin(w_1 t + \theta_1) + A_2 \sin(w_2 t + \theta_2) + \ldots A_n \sin(w_n t + \theta_n)$ where the difference of any two frequencies $w_i - w_j$ is much less than any individual frequency in the summation. The square of this signal, after some trigonometric identities have been applied, is given by Equation 5.

(5)
$$S(t)^2 = \sum_{i=1}^{i=n}\sum_{j=1}^{j=n} \frac{A_i A_j}{2} \cos[(w_i - w_j)t + \theta_i - \theta_j]$$
$$- \frac{A_i A_j}{2} \cos[(w_i + w_j)t + \theta_i + \theta_j]$$

Examination of this equation shows that the signal $S^2(t)$ is made up of frequency components that constitute all possible sums and differences of the frequencies of the signal $S(t)$. The sum frequencies are much higher than the difference frequencies.

The integral of a cosine term is given by Equation 6.

$$(6) \quad \int \cos wt = \frac{1}{w} \sin wt$$

It is obvious from this equation that, because of the $\frac{1}{w}$ term, the sum frequencies contribute very little to the total integral of $S^2(t)$ and can be omitted for practical purposes.

If these high frequency components can be eliminated in some way before the squaring operation, the necessary frequency response of the squaring circuit could be reduced. The following is a mathematical demonstration that the invention described here will allow the elimination of high frequency components before squaring. The results have been confirmed by experiment.

The band pass filter used in frequency analysis is narrow enough that the amplitude spectrum of the input is essentially flat over the band pass frequencies. If the filter is symmetrical, the output can be considered an amplitude-modulated signal whose carrier frequency $w_c$ is the center frequency of the pass band. Again substituting a finite, but large, number of frequencies for a continuous band of frequencies, the signal $S(t)$ can be written $$(7) \quad S(t) = [1 + B_1 \sin(w_1 t + \theta_1) + B_2 \sin(w_2 t + \theta_2) + \ldots B_n \sin(w_n t + \theta_n)] \sin w_c t$$

For simplification, let $$(8) \quad R(t) = [1 + B_1 \sin(w_1 t + \theta_1) + B_2 \sin(w_2 t + \theta_2) + \ldots B_n \sin(w_n t + \theta_n)]$$

Then $$(9) \quad S(t) = R(t) \sin w_c t$$

The frequencies in the modulating signal $R(t)$ are small compared to the carrier frequency $w_c$. When $R(t)$ is squared, the resulting signal $R(t)^2$ can be represented by sum and difference frequencies in the manner of Equation 5. Since the frequencies in $R(t)$ are small compared to $w_c$, these sum and difference frequencies will also be small compared to $w_c$.

Squaring and applying a trigonometric identity for $\sin^2 w_c t$ gives $$(10) \quad S(t)^2 = \tfrac{1}{2} R(t)^2 - \tfrac{1}{2} R(t)^2 \cos 2w_c t$$

To see that the second term contains only high frequency components, consider the trigonometric identity $$(11) \quad \cos A \cos B = \tfrac{1}{2} \cos(A-B) + \tfrac{1}{2} \cos(A+B)$$

The signal $R(t)^2$ contains only low frequency cosine terms. When these terms are multiplied by $\cos 2w_c t$, the result is sum and difference frequencies that differ from $2w_c$ by only a small amount and they are therefore rejected by a low pass filter. The resulting filtered signal is $$(12) \quad S(t)_F^2 = \tfrac{1}{2} R(t)^2$$

It was shown above that the high frequency components of a signal contribute very little to the integral of the signal. Therefore, the integral of the signal $S(t)^2$ and the filtered signal $S(t)_F^2$ are essentially the same.

The envelope of $S(t)$ obtained by rectifying and low pass filtering the amplitude modulated wave $S(t)$ is found by averaging over a half cycle of the carrier frequency.

$$(13) \quad S(t)_{RF} = \frac{1}{\pi} \int_{-\pi/2}^{\pi/2} R(t) \sin w_c t \, dw_c t = \frac{2}{\pi} R(t)$$

Squaring this signal gives $$(14) \quad S(t)_{RF}^2 = \frac{4}{\pi^2} R(t)^2$$

This is the same as Equation 12 except for a constant. Therefore integrating the output of a narrow band filter that has been rectified, low pass filtered, and squared is equivalent to integrating the output of the filter after squaring.

Referring now to FIG. 1 of the drawing, there is illustrated in block diagram form, the best mode contemplated for carrying out the invention. In that figure the input signal or transient is divided into a group of narrow band frequency components and the mean square voltage is determined for each such narrow frequency band component. The determination of the mean square voltage of each of these components then, permits the power spectrum for the transient signal being analyzed to be determined. The input signal that is desired to be analyzed is fed through suitable connecting lines to filters 10A through 10n. Filter 10A is normally preferably a narrow band pass filter which has a band pass width which is small compared to its center frequency; for example, a center frequency of 500 c.p.s. and a band pass of 1 c.p.s. Filter 10A may be a heterodyne type filter which is adjustable or it may have a fixed frequency. In a preferred system, the signal being analyzed is divided into its desired frequency components and there is a filter for each such component. The output of each filter 10A through 10n is fed respectively to full wave rectifier 12A through 12n. The output of full wave rectifier 12A through 12n is fed respectively to low pass filter 14A through 14n respectively. Filter 14A is a low pass filter which is of a character to pass frequencies of the band width of filter 10A or lower but reject the lowest frequency passed by filter 10A and all higher frequencies. The same relationship exists between filters 14A through 14n and filters 10B through 10n respectively.

The output of low pass filters 14A through 14n are fed respectively to squaring circuits 16A through 16n. These squaring circuits 16A through 16n are of a character to have an output signal which is the square of the signal fed thereto. The output of squaring circuits 16A through 16n are fed to integrators 18A to 18n respectively. These integrator means are of the character whose output is proportional to the integral of the input signal.

The output of each integrator at 18A through 18n is fed through selector switch 20 to analog to digital converter 22. Selector switch 20 can be a scanning switch designed for multiple channel inputs to an analog to digital converter 22. Converter 22 is of a type to convert the voltage value of integrators 18A to 18n to a digital value. The output of digital converter 22 is fed to recorder 24 which can be a punch card system or the like.

Having described the major components of the preferred embodiment, attention will now be directed toward its operation. An input signal, $f(t)$ as illustrated in FIG. 3, is fed to each band pass filter 10A through 10n. Each filter 10A through 10n passes a portion of the signal being analyzed such that the complete frequency band of interest is represented. Representative wave forms of the top parallel path or circuit including elements 10A, 12A, 14A, 16A and 18A will be discussed. The discussion, except for different frequencies of course, applies for the other parallel circuits. The output of band pass filter 10A is represented in FIG. 4. This is essentially a constant frequency output whose amplitude varies so as to have an envelope such as represented by dotted line 26. The wave form represented by FIG. 4 is fed to full-wave rectifier 12A and the rectified signal is illustrated in FIG. 6. The dotted line 28 represents the envelope of the rectified signal. The envelope 28 can be said to contain frequencies equal to and less than the band width of filters 10A through 10n. The output of rectifier 12A, which is illustrated in FIG. 6, is fed to filter 14A. The output of filter 14A is illustrated in FIG. 7, which is seen to be the envelope or to approximate the envelope 28 of the curve shown in FIG. 6. The frequency of curve 29 in FIG. 7 has a much lower frequency than the curve shown in FIG. 4 which is the output of band pass filter 10A. This is rather important as the curve in FIG. 7 is to be squared in order to obtain the power in the particular frequency band being analyzed. The frequency of the signal illustrated in FIG. 7 is no greater than the width of the band pass filter 10A. The signal illustrated in FIG. 7 is then fed to squaring circuit 16A to obtain a signal such as illustrated in FIG. 8. The signal 31 illustrated in FIG. 8 then is integrated in integrator 18A to obtain an integrated value F as shown in FIG. 9. The time scale on FIG. 9 is slightly different from the time scales on FIGS. 6, 7, and 8 which are the same. The integrator holds it during a reading period after $T_t$.

If it is desired to obtain the power of only one frequency band, the input signal can be fed only to filter 10A. This can readily be accomplished by means of switch 30 which is in the line from the input signal to the filters 10B through 10n. When switch 30 is in position 2 the line is open, and when it is in position 1 the line is closed. By placing switch 30 in position 2 the input signal goes only to band pass filter 10A. In this situation selector switch 20 is not needed and a switch 32 having positions 1, 2, and 3 can be provided in the output line from integrator 18A such that when switch 32 is in position 2 that the output integrator 18A is connected to selector switch 20, but when in position 1 the output of integrator 18A is electrically connected to digital converter 22. When switch 32 is in position 3, the output of integrator 18A is connected directly to a recorder 33. Recorder 33 can be of various types capable of recording an electrical signal such as an oscillograph, magnetic tape, etc. When the switches are in a position that uses only the top parallel circuit, the entire power spectrum can be obtained by repeatedly applying the same transient $f(t)$ to the input and adjusting the band pass filter 10A to pass a different portion of the signal each time until the entire frequency band of interest is covered. If the transient is only available once, it is recorded on a standard magnetic tape or some similar means and replayed repeatedly. A common method of adjusting the effect of the filter 10A is by using a fixed filter and heterodyning the input signal with a different frequency such that the portion of the frequency band to be measured matches the pass band of filter 10A. This method avoids the necessity of the additional parallel circuits.

FIG. 2 illustrates in block diagram form a conventional circuit for frequency spectrum analysis. It includes a band pass filter 34 to which the electrical transient $f(t)$ is fed. The output of filter 34 is similar to the output of filter 10A and could typically be illustrated as in FIG. 4. The output of filter 34 is fed to squaring circuit 36 whose output is illustrated in FIG. 5 as wave form 35. The squared output is integrated by intgerator 38.

To determine a comparison between the conventional circuit illustrated in FIG. 2 by elements 34, 36 and 38 as compared with elements 10A, 12A, 14A, 16A and 18A in FIG. 1, an identical electrical transient $f(t)$ was fed to band pass filter 34 and to filter 10A. The output of squaring circuit 36 was fed to a low pass filter 40 and compared to the output of squaring circuit 16A in FIG. 1. Also the power spectra of the same signals obtained by both methods were compared. The output of low pass filter 40 and the output of squaring circuit 16A were essentially identical in shape for the large number of signals observed. Since it has been previously shown that the high frequency component rejected by filter 40 contribute very little to the output of integrator 38, the equivalence of these wave forms shows equivalence of the outputs of integrators 38 and 18A. The power spectra of the same signal obtained by both methods were essentially identical, confirming that the output of integrators 38 and 18A are equivalent. However, it is clear that the conventional circuit shown in FIG. 2 quickly reaches its upper frequency limits as the frequencies being analyzed increase; this is because squaring circuit 36 must square that frequency being passed through band pass filter 34. However, in applicant's invention squaring circuit 16A (which has the same resolution and can be identical to squaring circuit 36) must square only a frequency which is the frequency width of the band pass filter 10A. As this is a much lower frequency, for analysis of the same frequency, the frequency requirement of the squaring circuit in applicant's invention is much less than that in the conventional system.

While there is above disclosed a limited number of embodiments of the system of the invention herein presented, it is possible to produce still other embodiments without departing from the inventive concept herein disclosed. It is therefore desired that only such limitation be imposed on the appended claims as are stated therein.

Various modifications of the system described herein can be made. For example, if one has an electrical signal whose center frequency is high compared to its band width and it is desired to find the mean square value of the signal, the system can be altered as follows. A single channel of the apparatus shown in FIG. 1 would be used with the elimination of band pass filter 10A. In other words the signal, which would not require band pass filtering, is fed directly to rectifier 12A. The output of rectifier 12A is passed through low pass filter 14A, then through squaring circuit 16A and its output integrated in integrator 18A substantially as described above.

While there is above disclosed a limited number of embodiments of the system of the invention herein presented, it is possible to produce still other embodiments without departing from the inventive concept herein disclosed. It is therefore desired that only such limitation be imposed on the appended claims as are stated therein.

What is claimed is:

1. An apparatus for use in determining the frequency power spectrum of a portion of an electrical transient, which comprises a combination: a first filter to which the transient is fed, said filter having a band pass of X cycles per second where X represents any numerical value which is small compared to the center frequency; a rectifier electrically connected to the output of said first filter; a second filter electrically connected to the output of said rectifier, said second filter being of a character to pass that portion of the signal fed to it having a frequency of X cycles per second or less; a squaring circuit electrically connected to the output of said second filter; and means to integrate the output of said squaring circuit.

2. An apparatus as defined in claim 1 in which the rectifier is a full wave rectifier.

3. A system for determining the power spectrum of a portion of an electrical transient having a frequency band of interest from $f_1$ to $f_2$ which comprises in combination: a plurality of parallel circuits with each circuit having a first filter having a narrow band pass of X cycles per second where X represents a numerical value, a rectifier electrically connected to the output of said first filter; a second filter electrically connected to the output of said full wave rectifier and being of a character to pass there through those electrical components having a frequency of X cycles per second or less, a squaring circuit electrically connected to the output of said second filter, an integrator means electrically connected to the output of said squaring circuit; means to connect the electrical transient to the first filter of each parallel circuit; a digital converter means of a character to convert analog information to digital information; a selector switch of a character to sequentially connect the output of each integrator means of each parallel circuit to said digital converter; and recording means electrically connected to the output of said digital converter.

4. An apparatus for use in determining the frequency power spectrum of a portion of an electrical transient which comprises in combination: a first filter means to which the transient is fed and which is of a character to pass there through a frequency component having a center frequency of Y cycles per second and a band pass of X cycles per second or less in which X is small compared to Y; where X and Y represent any numerical value; a rectifier means electrically connected to the output of said first filter, the output of said rectifier means defining an envelope; a second filter means electrically connected to the output of said rectifier means and being of a character to pass that portion of the signal fed to it having the frequency of X cycles per second but reject those frequencies of Y cycles or higher; a squaring circuit electrically connected to the output of said second filter means; means to integrate the output of said squaring circuit; and means to record the output of said integrating means.

5. An apparatus as defined in claim 4 in which the rectifier means is a full wave rectifier.

6. A system for determining the power spectrum of a portion of an electrical transient having a frequency band of interest from $f_1$ and $f_2$ which comprises in combination: a plurality of parallel circuits with each circuit having a first filter means to which the transient is fed and which is of a character to pass there through a frequency component having a center frequency of Y cycles per second and a band pass of X cycles per second where X and Y represent any numerical value and X is small compared to Y, a rectifier means electrically connected to the output of said first filter, a second filter means electrically connected to the output of said rectifier means and being of a character to pass that portion of the signal fed to it having a frequency of X cycles per second or less but reject those frequencies of Y cycles or higher, a squaring circuit electrically connected to the output of said second filter means, means to integrate the output of said squaring circuit; and means to record the output of the means to integrate of each parallel circuit.

7. An apparatus as defined in claim 6 in which the recording means includes a digital converter means of a character to convert analog information to digital information; a selector switch of a character to sequentially connect the output of each means to integrate of each parallel circuit to said digital converter.

8. An apparatus for use in determining the mean square value of an electrical signal in which the center frequency is high compared to its band width which comprises in combination: a rectifier electrically connected to said signal; a low pass filter electrically connected to the output of said rectifier, said filter being of a character to pass only that portion of the electrical signal fed to it having a frequency equivalent to the band width of said signal or less; a squaring circuit electrically connected to the output of said filter; and means to integrate the output of said squaring circuit.

9. An apparatus as defined in claim 6 in which the first filter means has a band-pass of one cycle per second.

References Cited in the file of this patent

UNITED STATES PATENTS

| | | |
|---|---|---|
| 2,492,062 | Potter | Dec. 20, 1949 |
| 2,851,661 | Buland | Sept. 9, 1958 |
| 2,904,682 | Rawlins | Sept. 15, 1959 |
| 2,928,071 | Feagin et al. | Mar. 8, 1960 |
| 2,952,012 | Rodgers et al. | Sept. 6, 1960 |
| 2,971,058 | Olson et al. | Feb. 7, 1961 |
| 3,030,450 | Schroeder | Apr. 17, 1962 |
| 3,035,228 | Ratz | May 15, 1962 |

OTHER REFERENCES

"On Filter Problems of the Power Spectrum Analyzer," Proceedings of the I.R.E., August 1954, pages 1278–1282.

"A Multichannel Noise Spectrum Analyzer for 10–10,000 Cycles," article, The Review of Scientific Instruments, September 1954, pages 899–901.